United States Patent Office 3,679,629
Patented July 25, 1972

3,679,629
METHOD FOR STABILIZING POLYCARBONATES AND COMPOSITIONS MADE THEREBY
Alan J. Chalk and Arnold Factor, Scotia, N.Y., assignors to General Electric Company
No Drawing. Filed Apr. 1, 1971, Ser. No. 130,492
Int. Cl. C08g 51/04, 51/58
U.S. Cl. 260—37 PC    4 Claims

ABSTRACT OF THE DISCLOSURE

A method is provided for improving the resistance of polycarbonate resins to yellowing, resulting from molding the resin at temperatures between 500° F.–700° F. There is utilized an effective amount of an organosilicon hydride such as trihexylsilane. There also is provided polycarbonate compositions made by such method exhibiting stability toward color change during molding and subsequent fabrication.

---

The present invention relates to a method for stabilizing polycarbonate resins with certain organo-silicon hydrides, and to the polycarbonate resin compositions made thereby.

Polycarbonate resin has gained wide acceptance in industry because of its superior impact strength and other desirable thermoplastic characteristics, such as clarity. For example, polycarbonate sheets have been used in place of glass in applications requiring high impact resistance. One of the shortcomings of polycarbonate resin is that it has a tendency to yellow at temperatures above 100° C. over extended periods of time, or when molded or re-worked in fabricating applications, employing temperatures in the range of about 500°–700° F. Various methods have been used to improve the stability of polycarbonate resins to resist this tendency to yellow. One method, for example, is based on the use of a triorganophosphite, such as taught by Fritz et al. Pat. 3,305,520. Another method is based on the employment of a pigment such as ultramarine, which can be in the form of ultramarine blue or a mixture of ultramarine blue and ultramarine violet. The ultramarine pigment can be employed to tint the polycarbonate resin while serving as a masking agent to offset the yellowing tendency of the resin upon regrinding, commonly revealed by the Yellowness Index or YI of the resin. Attempts to employ the aforementioned triorganophosphate stabilizer in combination with the ultramarine pigment to minimize the YI of the resin upon molding, have generally been unsuccessful. It has been found that the triorganophosphite liberates by-products during molding, which have an adverse effect on the performance of the ultramarine pigment. Improved results have been achieved by using a cyclic aliphatic epoxy compound in combination with the triorganophosphite, such as 3,4-epoxy cyclohexylmethyl-3,4-epoxy cyclohexanecarboxylate to offset the deleterious effects of the triorganophosphite. Although polycarbonate resin has been formulated by such method exhibiting enhanced stability towards yellowing upon molding, the use of a plurality of such resin stabilizers is required.

The present invention is based on the discovery that effective stabilization of the polycarbonate resin can be achieved without the employment of the above triorganophosphite resulting in the elimination of the problem of having to utilize a plurality of resin stabilizers, such as the aforedescribed combination of the triorganophosphite and cyclo aliphatic epoxy compound. It has been found that the use of an effective amount of a triorganosilane having a boiling point in excess of 150° C. at 760 mm., and included by the formula, $$R_3SiH$$

in combination with ultramarine pigment can effect both stabilization toward yellowing and pigmentation of the polycarbonate resin. Radicals included by R are, for example, aryl radicals, such as phenyl, tolyl, xylyl, etc.; alkyl radicals such as hexyl, heptyl, octyl, etc.

Some of the triorganosilanes included by the above formula are organosilicon hydrides such as triphenyl silane, tritolyl silane, phenylditolyl silane, trihexyl silane, etc.

There also is provided by the present invention, polycarbonate compositions having improved stability toward yellowing comprising polycarbonate resin having an intrinsic viscosity in methylene chloride at 25° C. of between .45 to .62 dl./g., and from 0.1 to 2.0% by weight thereof of a triorganosilane.

The polycarbonate resins utilized in the practice of the invention can be made by the employment of dihydric phenols and a carbonyl halide such as phosgene by standard procedures. The polycarbonates which can be employed in the practice of the present invention are any aromatic polycarbonates generally made by the reaction of a dihydric phenol and a carbonyl halide. Some of the dihydric phenols which can be employed are, for example, 1,1 - bis(4 - hydroxyphenyl)-methane, 2,2-bis(4-hydroxyphenyl)-propane, 2,2-bis(4-hydroxy-3-methylphenyl)-propane, 4,4-bis(4-hydroxyphenyl)-heptane, etc., dihydric phenol ethers such as bis(4-hydroxyphenyl)-ether, etc., dihydroxy biphenyls such as p,p'-dihydroxybiphenyl, etc., dihydroxyaryl sulfones such as bis(4-hydroxyphenyl)-sulfone, bis(3,5-dimethyl-4-hydroxyphenyl)-sulfone, bis(3-methyl-5-ethyl-4-hydroxyphenyl)-sulfone, etc., dihydroxy benzenes such as resorcinol, hydroquinone, lower alkyl-substituted dihydroxy benzenes such as 1,4-dihydroxy-2-methylbenzene, 1,4-dihydroxy-2,3-methylbenzene, 1,4-dihydroxy-3-methylbenzene, etc., and dihydroxy diphenyl sulfoxides such as bis(4-dihydroxyphenyl)-sulfoxide, bis-(3,5-dimethyl-4-hydroxyphenyl)-sulfoxide, etc. A variety of additional dihydric phenols are also available to provide carbonate polymers and are disclosed in U.S. Pats. 2,999,835, 3,028,365, and 3, 153,008. It is of course possible to employ two or more different dihydric phenols or a copolymer of a dihydric phenol with glycol, a hydroxy or an acid terminated polyester, or a dibasic acid in the event a carbonate copolymer or interpolymer rather than a homopolymer is desired for use in the preparation of the aromatic carbonate polymers of this invention. Carbonyl halides which can be utilized are, for example, carbonyl chloride, as well as carbonate esters and halo formates. The carbonyl halides which can be employed herein are carbonyl bromide, carbonyl chloride, carbonyl fluoride, etc., or mixtures thereof. Typical of the carbonate esters which may be employed herein are diphenyl carbonate, di-(alkylphenyl) carbonates such as di-(methylphenyl) carbonate, di-(ethylphenyl) carbonate, di(trimethylphenyl) carbonate, di-(triethylphenyl) carbonate, etc., di-(alkylphenyl) carbonates such as di-(xylyl) carbonate, etc., di-(naphthyl) carbonate, di-(methylnaphthyl) carbonate, phenyl tolyl carbonate, alkylphenyl alkylnaphthyl carbonate, etc. or mixtures thereof. The haloformates suitable for use herein include bishaloformates of dihydric phenols (bischloroformates of hydroquinone, etc.) or glycols (bishaloformates of ethylene glycol, neopentyl glycol, polyethylene glycol, etc.) While other carbonate precursors will occur to those skilled in the art carbonyl chloride, also known as phosgene is preferred.

In the practice of the invention, triorganosilane is incorporated into the polycarbonate resin prior to the molding of the polycarbonate to provide for the production of polycarbonate compositions having improved stability to change in color during molding. One method of incorporation of the triorganosilane into the polycarbonate resin is to treat the resin with a solution of the triorganosilane in an organic solvent, particularly if the triorganosilane is a solid at room temperature. Additional methods are to dry blend the resin with the triorganosilane or agitate a mixture of the triorganosilane and the resin especially in instances where the triorganosilane is a liquid at room temperature. A proportion of at least 0.1% by weight of triorganosilane has been found to provide effective results while up to 2% by weight or higher can be employed without adversely affecting the molding properties of the resin.

In order that those skilled in the art will be better able to practice the invention, the following examples are given by way of illustration and not by way of limitation. All parts are by weight.

EXAMPLE 1

Commercially available powdered polycarbonate resin having an intrinsic viscosity of 0.45 dl./g. in methylene chloride at 25° C. was blended with various stabilizers to evaluate the ability of the stabilizers to improve the resistance of the resin to yellowing upon molding at temperatures of 600° F. or above. After thoroughly mixing the resin and additives, the blends were extruded into pellets prior to being molded at 600° F. The blends were molded into test chips to more readily determine their YI after an initial molding at 600° F. and after being reground and molded twice more at 600° F.

Control chip A was made free of additives. Chip B was made from a blend of the polycarbonate resin and .0001 part of ultramarine pigment consisting of a mixture of ultramarine blue and ultramarine violet, per part of the polycarbonate. In addition, to chips A and B, chip C was made by molding a mixture of about .001 part of trihexylsilane, per part of the polycarbonate resin. Chip D was molded from a mixture of polycarbonate resin, .001 part of trihexylsilane and 0.0001 part of the aforementioned ultramarine pigment, per part of polycarbonate resin. In addition to chips A-D, there also was prepared test chip E, which was made with per part of polycarbonate resin, 0.0001 part of the ultramarine pigment, and 0.00076 part of diphenyldecyl phosphite. In addition, test chip F was made free of the ultramarine pigment, but contained the same weight of diphenyldecyl phosphite as E.

The following table shows the results obtained in terms of the Yellowness Index (YI), in accordance with ASTM Yellow Index Test D1925–63T, with chips A–F, after a first molding at 600° F., and after the same chips had been reground twice and remolded for a third time at 600° F. In the following table, none indicates polycarbonate free of additive, SiH is trihexylsilane, P is organophosphite and UM is ultramarine pigment.

YI INDEX

| Chip: | Additive | 600° F. (1st) | 600° F. (3d) |
|---|---|---|---|
| A | None | 4.2 | 7.5 |
| B | UM | 3.6 | 5.6 |
| C | SiH | 2.9 | 5.1 |
| D | UM+SiH | 2.1 | 4.4 |
| E | UM+P | 2.0 | 5.5 |
| F | P | 2.3 | 3.9 |

The above table shows that after the first molding, the trihexylsilane (chip C) improved the resistance of the resin to yellowing, as compared to resin free of stabilizer (chip A). The combination of trihexylsilane and the ultramarine pigment (chip D) substantially improved the YI of the resin after it was initially molded at 600° F. and after it had been remolded a third time at 600° even through the resin had been reground at least twice. It is also significant that the diphenyldecyl phosphite degraded the ultramarine (chip E) after the resin had been reground at least twice, so that the YI of the resin was significantly higher as compared to the resin containing the phosphite alone (chip F). Those skilled in the art would know that the use of diphenyldecyl phosphite in combination with ultramarine pigment results in the production of undesirable by-products, which interferes with the ability of both the ultramarine pigment and diphenyldecyl phosphite to minimize the yellowing tendency of the resin upon molding. Although trihexylsilane alone is not as effective as the diphenyldecyl phosphite as a polycarbonate resin stabilizer, it is a valuable stabilizer for polycarbonate resins containing ultramarine pigment for purposes of making tinted polycarbonates exhibiting an improved resistance to yellowing after molding.

EXAMPLE 2

In accordance with the procedure of Example 1, a polycarbonate blend is prepared containing 0.0001 part of ultramarine pigment, 0.001 part of triphenylsilane, per part of polycarbonate resin. It is found that the YI of chips made from the triphenylsilane blend, following the same molding and regrind procedures of Example 1, is substantially the same as obtained from the trihexylsilane blend.

Although the above examples are directed to a few of the triorganosilanes which can be employed in the practice of the invention, it should be understood that the present invention is directed to the use of a much broader class of triorganosilanes, and polycarbonate blends containing such materials.

What we claim as new and desire to secure by Letters Patent of the United States:

1. Polycarbonate compositions comprising a polycarbonate resin and from 0.1 to 2% by weight thereof of a triorganosilane having the formula $$R_3SiH$$

where R is a monovalent hydrocarbon radical.

2. A composition in accordance with claim 1, containing an effective amount of an ultramarine pigment.

3. A composition in accordance with claim 1, where the triorganosilane is triphenylsilane.

4. A composition in accordance with claim 1, where the triorganosilane is trihexylsilane.

References Cited

UNITED STATES PATENTS

| 3,509,090 | 4/1970 | Miller | 260—45.7 |
| 3,100,753 | 8/1963 | Spencer | 260—29.1 |
| 3,498,946 | 3/1970 | Calkins | 260—37 |
| 3,525,706 | 8/1970 | Calkins | 260—37 |
| 3,539,530 | 11/1970 | Karstedt | 260—45.75 |

DONALD E. CZAJA, Primary Examiner

R. A. WHITE, Assistant Examiner

U.S. Cl. X.R.

260—45.7 R